(12) United States Patent
Shuholm

(10) Patent No.: US 6,597,731 B1
(45) Date of Patent: Jul. 22, 2003

(54) CIRCUIT FOR PROCESSING A DIGITAL DATA SIGNAL

(75) Inventor: Kevin J. Shuholm, Grass Valley, CA (US)

(73) Assignee: Nvision, Inc., Grass Valley, CA (US)

( * ) Notice: Subject to any disclaimer, the term of this patent is extended or adjusted under 35 U.S.C. 154(b) by 0 days.

(21) Appl. No.: 09/527,975

(22) Filed: Mar. 17, 2000

(51) Int. Cl.[7] ................................................. H04B 1/38
(52) U.S. Cl. ....................................... 375/220; 375/257
(58) Field of Search ................................. 375/220, 257; 327/333, 307; 330/141

(56) References Cited

U.S. PATENT DOCUMENTS

| | | | | |
|---|---|---|---|---|
| 5,050,187 A | * | 9/1991 | Ichie | ........................... 375/257 |
| 6,304,144 B1 | * | 10/2001 | Yamazaki et al. | ........... 330/259 |
| 6,459,323 B2 | * | 10/2002 | Birkeli | ........................ 327/333 |

* cited by examiner

*Primary Examiner*—Stephen Chin
*Assistant Examiner*—Kevin Kim
(74) *Attorney, Agent, or Firm*—John Smith-Hill; Smith-Hill and Bedell

(57) ABSTRACT

A circuit for processing a differential serial digital data signal provided by a signal source includes a transmission line and an amplifier. A first capacitor couples a first conductor of the transmission line to a first input of the amplifier and a second capacitor couples a second conductor of the transmission line to a second input of the amplifier, and a termination resistor is connected between the first and second inputs of the amplifier. The capacitance value of the first capacitor is such that the time constant of the first capacitor and the termination resistor is about one-third of one bit time of the serial digital data signal and the capacitance value of the second capacitor is substantially greater than the capacitance value of the first capacitor.

2 Claims, 2 Drawing Sheets

CIRCUIT FOR PROCESSING A DIGITAL
DATA SIGNAL

BACKGROUND OF THE INVENTION

This invention relates to a circuit for processing a digital data signal.

A typical topology for a video production facility in which a digital video signal is generated and is supplied to a selected destination via a router is shown in FIG. 1. The digital video signal is generated in single-ended form by a source 10 which impresses the signal on a coaxial cable 12. The coaxial cable is provided at its far end with a connector, which engages a mating connector attached to the router. The coaxial cable typically has a characteristic impedance of 75 ohms and is terminated by a 75 ohm resistor 14 located inside the router. The coaxial cable is AC coupled by a capacitor 16 to an equalizer 18, which provides a differential output signal. The output signal of the equalizer 18 is DC coupled to the router's switching matrix 26 through a differential bus driver 20 and a differential bus receiver 24. The differential output of the bus receiver is supplied to the matrix through a 100 ohm balanced transmission line 28, which is terminated by a 100 ohm resistor (not shown in FIG. 1). Generally, the termination resistor is inside the matrix. The matrix operates under control of a router controller (not shown) to connect the differential input of the matrix to a destination 34 (or a selected group of destinations). Recovery of the video data at the destination 34 can conveniently be depicted by a differential amplifier 36 which forms the difference of the two components of the differential output signal of the router and provides a single-ended signal to a comparator 40. The comparator 40 compares the voltage of the single-ended signal with a slice level $V_{slice}$ under control of a sampling clock SCLK. In practice, the comparator 40 may be implemented by a reclocker inside the router.

The matrix 26 may be implemented by multiple crosspoint chips 32, each of which includes logic gates 30 and an amplifier 42 which has sufficient gain A to ensure that the two components of the differential signal supplied to the logic gates will each saturate to its maximum logic output level. The gain A is typically in excess of 1000 and the output signal level of the amplifier 42 is 800 mV single-ended peak-to-peak. The inputs of the amplifier 42 are biased by equal value resistors (not shown in FIG. 1), typically having a resistance of about 2 kohm.

For reliable recovery of the data at the destination, the eye pattern of the differential signal must be open at all points upstream of the differential amplifier 36. In particular, it is necessary that the eye pattern of the data waveforms at the output of the amplifier 42 be open.

Typically, the waveform of the digital signal generated by the source 10 has steep transitions of fairly uniform slew rate and has a relatively flat base and a relatively flat top, as shown by waveform A in FIG. 2. This ideal waveform is degraded in the signal path to the matrix 26, such that the two components of the differential signal applied to the crosspoint chip 32 might have the waveform B shown in FIG. 2.

One factor that affects the size of the eye opening is the offset voltage in the signal path. Generally, an offset voltage is applied to the differential signal by each component through which the differential signal passes. The offset voltage $V_{os}$ of the amplifier 42 can be represented by the voltage source 44 at the input of the amplifier, as shown in FIG. 1. The offset voltage adds a DC component $A*V_{os}$ to one component of the differential output signal of the amplifier. The offset voltage therefore shifts the relative levels of the components of the differential output signal of the amplifier 42 with the result that the eye opening becomes smaller.

A large crosspoint chip is designed to manage the offset voltages of its internal components without excessive eye pattern distortion but any additional input offset contained in the signal applied to the crosspoint chip will result in eye pattern distortion that might be unacceptable. Indeed, in view of the high gain of the amplifier 42, an additional input offset as small as 0.8 mv will cause the amplifier to saturate. It is therefore necessary to ensure that any offset due to upstream components is not presented to the crosspoint chip.

The digital video signal generated by the source 10 may be the serial digital interface, or SDI, signal defined in SMPTE 259 or SMPTE 292. SMPTE 259 and SMPTE 292 each prescribe a polynomial, or PN, scrambler which functions well to generate baseband data having minimal DC content provided that the video data supplied to the scrambler is random, or nearly random. When the source of the video data is a camera, noise generated in the camera provides a sufficient degree of randomness. However, the content of some computer generated video data is not sufficiently random, and the PN scrambler can generate baseband data having very long runs of consecutive 1's and 0's in response to these so-called pathological signals. The pathological signals thus have a significant non-zero DC content. The DC content of the signal supplied by the source 10 is removed by the AC coupling capacitor 16. Consequently, in the case of the digital video signal being an SDI signal, the equalizer 18 will typically include a DC restoration function in order to restore the DC level of the signal.

It would in principle be possible to eliminate or reduce the accumulated offset voltages of components upstream of the crosspoint chip by use of AC coupling capacitors at the inputs of the bus driver 20 and the bus receiver 24 but the cost of providing the AC coupling capacitors is significant. In addition, use of AC coupling capacitors could cause low frequency data patterns, such as the pathological signal, to generate jitter.

It has been proposed that the problem of cumulative voltage offsets would be eliminated or reduced by providing AC coupling capacitors between the differential output of the bus receiver 24 and the differential input of the amplifier 42. The AC coupling capacitors, each typically having a value of 0.1 $\mu F$, differentiate the two components of the differential input signal received by the amplifier. Accordingly, ignoring the voltage offset of the amplifier 42 because it is managed internally of the crosspoint chip, the output waveform of the amplifier varies substantially as shown in FIG. 2C. Although there is a substantial, and easily measurable, difference between the voltage levels of the two differential components at the beginning of the bit period, towards the end of the bit period the voltage difference rapidly becomes smaller and accordingly the eye pattern closes and the data value cannot be accurately recovered at the destination 34. It has further been proposed that only one component of the differential signal should be AC coupled to the amplifier 42 and that the other component should be DC coupled to the amplifier, but this also has proved unsatisfactory.

SUMMARY OF THE INVENTION

In accordance with the invention there is provided a circuit for processing a differential serial digital data signal provided by a signal source, said circuit comprising a transmission line having first and second conductors for coupling to respective output terminals of the signal source, an amplifier having first and second differential inputs, a first capacitor coupling the first conductor of the transmission line to the first input of the amplifier, a second capacitor coupling the second conductor of the transmission line to the second input of the amplifier, and a termination resistor connected between the first and second inputs of the amplifier, and wherein the capacitance value of the first capacitor is such that the time constant of the first capacitor and the termination resistor is about one-third of one bit time of the serial digital data signal and the capacitance value of the second capacitor is substantially greater than the capacitance value of the first capacitor.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
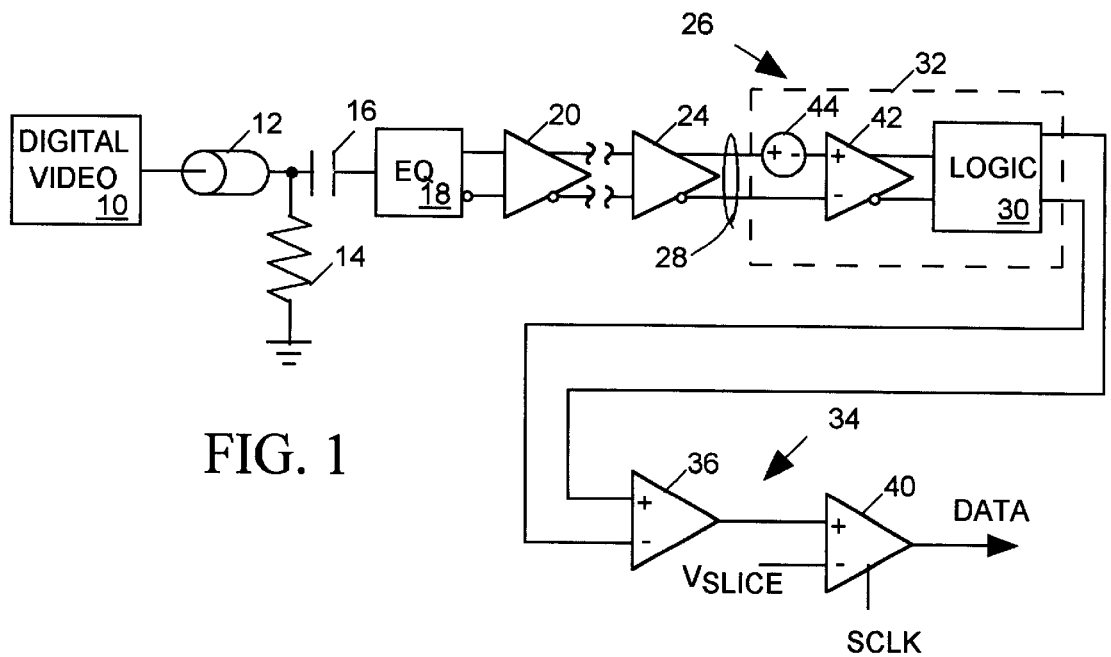
FIG. 1 is a block schematic diagram of a circuit arrangement for distributing digital video data.
Figure 2:
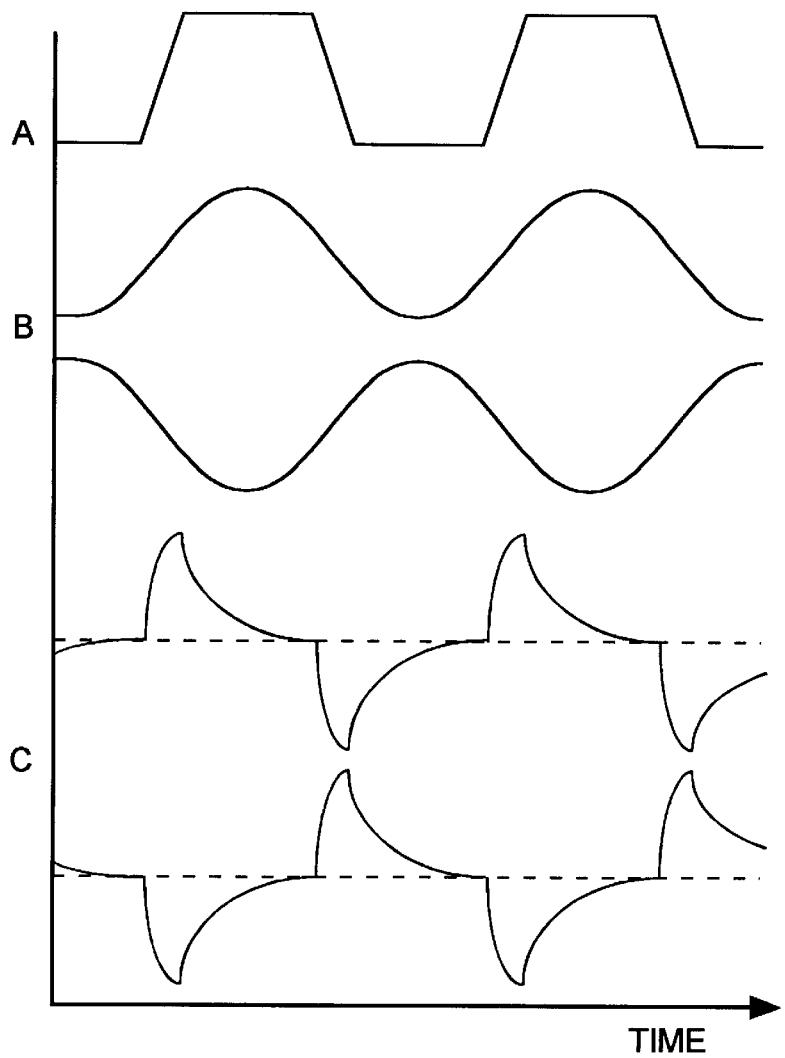
FIG. 2 illustrates waveforms at various points in the circuit of FIG. 1.
Figure 3:
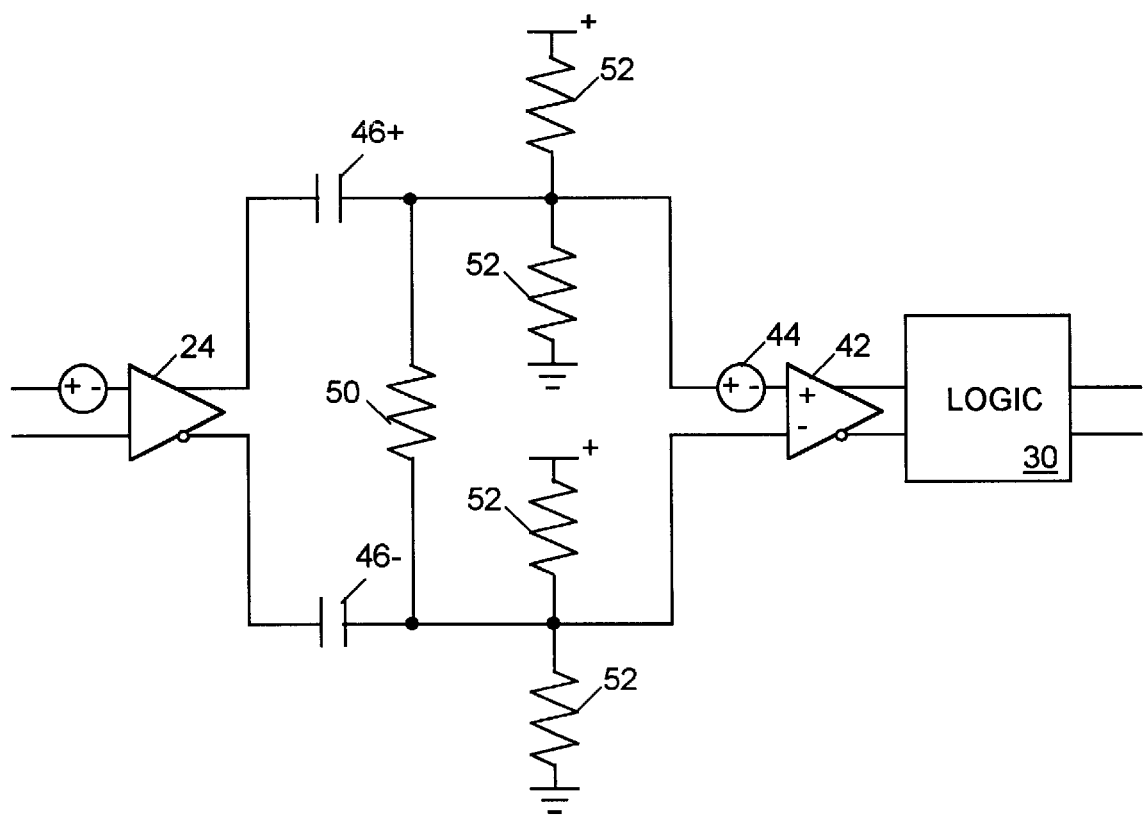
FIG. 3 is a schematic diagram of a circuit in accordance with the present invention.
Figure 4:
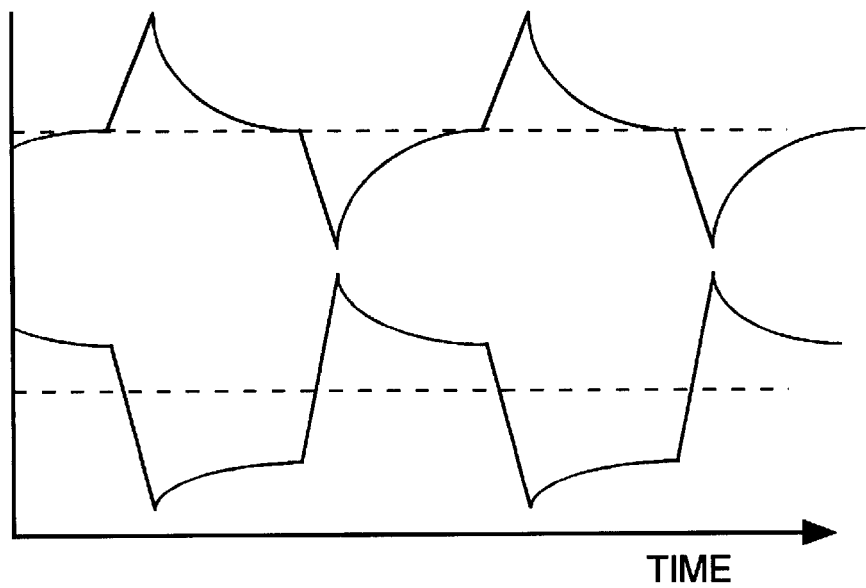
FIG. 4 illustrates waveforms at various points in the circuit of FIG. 3.

Referring to FIG. 3, which illustrates the 100 ohm termination resistor 50 and the bias resistors 52, the differential outputs of the bus receiver 24 are connected to the inputs of the amplifier 42 using two coupling capacitors 46+, 46− of substantially different capacitance values. It will be assumed for the purpose of this discussion that the capacitor 46+ has the smaller capacitance value but it will be appreciated by those skilled in the art that this is not critical and the capacitor 46+ could in fact have the larger capacitance value.

The two capacitors 46 effectively AC couple the differential signal to the input of the amplifier 42, thus isolating the DC offsets upstream of the coupling capacitors 46 from the amplifier. Because the capacitance value of the capacitor 46+ is much smaller than the capacitance value of the capacitor 46−, the capacitor 46− discharges much more slowly than the capacitor 46+. Consequently there is a substantial voltage difference between the inputs of the amplifier 42 at the end of the bit time and the data value can be reliably recovered at the destination 34.

The capacitor 46+ is selected so that the time constant of the capacitor and the termination resistor 50 is approximately one-third of one bit period of the digital signal and the capacitor 46− is selected so that the time constant of the capacitor and the termination resistor 50 is 15 times the longest expected duration of continuous 1 or 0 data, equivalent to 15 lines of serial HDTV data in accordance with SMPTE 292 or 8 lines of serial SDTV data in accordance with SMPTE 259. In this case, the signal at the non-inverting input of the amplifier 42 decays to about 1–2 percent of its maximum or peak value by the end of one bit time whereas the signal at the inverting input barely decays at all, and the difference between the two signal components at the end of one bit time is almost as great as the peak difference.

In the case of the digital video signal being an SDI signal, the capacitance value of the capacitor 46− is selected so that the time constant of the capacitor 46− and the termination resistor 50 is greater than 3.5 $\mu$s whereas the capacitance value of the capacitor 46+ is selected so that the time constant of the capacitor 46+ and the termination resistor 50 is less than about 2.4 ns. The capacitor 46− and the termination resistor 50 have a sufficiently long time constant that they do not block the pathological signals that can be present in an SDI data stream.

The SDI signal is not the only signal that can have a significant DC component. For example, for NRZ or NRZI codes a PN scrambler is typically used to improve the one's density and these scramblers have known or calculable worst case conditions for consecutive 1 or 0 data.

It will be appreciated that the invention is not restricted to the particular embodiment that has been described, and that variations may be made therein without departing from the scope of the invention as defined in the appended claims and equivalents thereof.

What is claimed is:

1. A circuit for processing a differential serial digital data signal provided by a signal source, said circuit comprising:

a transmission line having first and second conductors for coupling to respective output terminals of the signal source, an amplifier having first and second differential inputs, a first capacitor coupling the first conductor of the transmission line to the first input of the amplifier, a second capacitor coupling the second conductor of the transmission line to the second input of the amplifier, and a termination resistor connected between the first and second inputs of the amplifier, and wherein the capacitance value of the first capacitor is such that the time constant of the first capacitor and the termination resistor is about one-third of one bit time of the serial digital data signal and the capacitance value of the second capacitor is substantially greater than the capacitance value of the first capacitor.

2. A circuit according to claim 1, wherein the signal source includes a video data generator which generates a single-ended serial digital interface signal and an equalizer which receives the single-ended serial digital interface signal and generates the differential serial digital data signal, and the time constant of the termination resistor and the first capacitor is less than about 2.4 ns and the time constant of the termination resistor and the second capacitor is greater than about 3.5 $\mu$s.

* * * * *